(12) United States Patent
Lee et al.

(10) Patent No.: US 7,531,206 B2
(45) Date of Patent: May 12, 2009

(54) FLEXIBLE EMITTER USING HIGH MOLECULAR COMPOUND AND METHOD FOR FABRICATING THE SAME

(75) Inventors: Hyun-Jung Lee, Daejeon-si (KR); Jong-Woon Moon, Suwon-si (KR); Sang-Hyun Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 792 days.

(21) Appl. No.: 11/139,677

(22) Filed: May 31, 2005

(65) Prior Publication Data

US 2005/0263388 A1     Dec. 1, 2005

(30) Foreign Application Priority Data

May 31, 2004     (KR) .................. 10-2004-0039225

(51) Int. Cl.
*B05D 5/12* (2006.01)
(52) U.S. Cl. .................. 427/77; 427/249.1; 427/58; 427/66; 427/256; 427/282; 362/147; 313/495; 445/24
(58) Field of Classification Search .................. 427/77, 427/223, 58
See application file for complete search history.

(56) References Cited

U.S. PATENT DOCUMENTS

| 2002/0074932 A1* | 6/2002 | Bouchard et al. ........... 313/495 |
| 2004/0166235 A1* | 8/2004 | Fujii et al. .................... 427/77 |
| 2004/0252488 A1* | 12/2004 | Thurk .......................... 362/147 |

* cited by examiner

Primary Examiner—Michael Barr
Assistant Examiner—Andrew Bowman
(74) Attorney, Agent, or Firm—Robert E. Bushnell, Esq.

(57) ABSTRACT

A method of fabricating a flexible emitter using a high molecular compound, including forming an electro-luminescent carbon material on a glass substrate in a predetermined pattern in order to form an emitter pattern thereon, forming an electrode layer of a predetermined height on the emitter pattern and the glass substrate, applying a polymer gel material on the electrode layer, curing the polymer gel material, and separating the flexible emitter from the glass substrate.

19 Claims, 7 Drawing Sheets

FLEXIBLE EMITTER USING HIGH MOLECULAR COMPOUND AND METHOD FOR FABRICATING THE SAME

CLAIM OF PRIORITY

This application makes reference to, incorporates the same herein, and claims all benefits accruing under 35 U.S.C. § 119 from an application for A FLEXIBLE EMITTER USING HIGH MOLECULAR COMPOUND AND A METHOD FOR FABRICATING THE SAME earlier filed in the Korean Intellectual Property Office on 31 May 2004 and there duly assigned Serial No. 10-2004-0039225.

BACKGROUND OF THE INVENTION

1. Field of the Invention

The present invention relates to a flexible emitter and a method for fabricating the same, and more particularly, to a method of fabricating a flexible emitter using a high molecular compound.

2. Description of the Related Art

Flexible displays are revolutionary paper-like displays that can be folded or rolled without damage. Due to high portability, the flexible displays emerge as one of the promising next-generation displays. Organic electro-luminescence (EL) devices or field emission devices (FEDs) may be used to realize a flexible display.

Development of foldable/rollable emitters is required to realize a flexible display using FEDs. Typical flexible emitters are realized by forming an emitter composed of a carbon nanotube (CNT) having EL characteristics on a polymer substrate.

Two conventional methods are used to fabricate a flexible emitter. One method is to grow a carbon material on a seed material formed on a polymer substrate. This method requires forming a seed material, such as iron (Fe), nickel (Ni), cobalt (Co), or Fe—Ni—Co alloy, on a polymer substrate, patterning the seed material into a desired shape of an emitter, and growing EL carbon materials, such as CNTs, on the seed material in a vertical orientation using chemical vapor deposition (CVD).

The other method involves attaching a radical to carbon materials and self-assembling the carbon materials onto a polymer substrate where gold (Au) or silver (Ag) pattern is formed. More specifically, CNTs are dissolved into a solvent containing radicals such as a carboxyl radical (—COOH), and then the polymer substrate, on which Au or Ag has been patterned, is immersed into the resulting solution for a predetermined period. Typically, some radicals, such as the carboxyl group, readily react and combine with the CNTs or metal, such as Ag or Au. Therefore, the radicals within the solution are attached to the ends of the dissolved CNTs and the radicals attached to the CNTs are combined with the metal, such as Ag or Au. Consequently, the CNTs are bonded to Au or Ag through the radicals. When the polymer substrate is removed from the solution, cleaned, and dried, a flexible emitter consisting of CNTs vertically aligned on a metal pattern deposited on the polymer substrate is obtained.

However, the conventional method not only requires numerous steps as described above to position the carbon material on the desired locations but also makes it difficult to uniformly distribute the carbon material over the polymer substrate. To improve field emission characteristics, a separate activation process is required on a completed flexible emitter, i.e., by uniformly cutting an upper end of a CNT. The former method suffers restrictions in growth temperature due to the thermally sensitive polymer when the carbon materials are grown using CVD. Another drawback of the former method is that a multi-walled CNT (MWNT) having a large diameter used as a carbon material grown by CVD exhibits inferior field emission characteristics to a single-walled CNT (SWNT) of a small diameter.

To solve these problems, an approach to apply a carbon material in a paste or slurry form on a metal has been proposed. However, this approach has a drawback in that the carbon material tends to be easily removed and unused during activation due to weak adhesive forces between the carbon material having EL characteristics and the metal. Furthermore, increasing the adhesive force results in severe degradation of field emission characteristics.

SUMMARY OF THE INVENTION

It is therefore, an object of present invention to provide a method for fabricating a flexible emitter that can realize a fine emitter pattern by a simple method, uniformly distribute carbon materials, and eliminates the need for activation.

It is another object of the present invention to provide a flexible emitter manufactured by the same method.

It is yet another object of the present invention to provide an easy technique to fabricate a flexible emitter of varying shapes and sizes depending upon the type of application (display, sensor, FET (field effect transistor), etc.).

It is still another object of the present invention is to allow the use of a carbon material in a paste or slurry form that has never been used since it tends to be easily removed during activation due to poor adhesion to indium tin oxide (ITO) or a metal substrate in spite of its excellent field emission characteristics, since this material can be formed on the polymer substrate as an emitter in order to provide excellent emission characteristics, it is possible to widen the range of materials to be used for forming the emitter, therefore, various emitter materials with excellent emission characteristics can be used to obtain a high quality flexible emitter.

It is another object of the present invention to eliminate the need for activation since surface treatment is made automatically when the flexible emitter is separated from a glass substrate, thereby reducing the manufacturing costs and time, therefore, the present invention provides a flexible emitter having superior characteristics with lower manufacturing costs.

According to an aspect of the present invention, there is provided a method of fabricating a flexible emitter using a high molecular compound, including: forming an electroluminescent carbon material on a glass substrate in a predetermined pattern in order to form an emitter pattern thereon; forming an electrode layer of a predetermined height on the emitter pattern and the glass substrate; applying a polymer gel material on the electrode layer; curing the polymer gel material; and separating the flexible emitter from the glass substrate.

The emitter pattern may be formed on the glass substrate by screen printing a carbon material in a paste form onto the glass substrate through a mask or by applying the carbon material in a paste form on the glass substrate and patterning the same through an ultraviolet (UV) exposure.

In this case, the carbon material includes at least one of a carbon nanotube (CNT), fullerene C60, diamond, diamond-like carbon (DLC), and graphite. The CNT may be either single-walled or multi-walled.

The electrode layer may be formed by applying a metal paste on the emitter pattern and the glass substrate and drying the same or by sputtering a metal material onto the emitter pattern. The metal may be silver (Ag).

The polymer material is a UV curable photosensitive resin or thermosetting resin. The UV curable photosensitive resin can be an acrylate-based resin. In particular, it includes at least one of epoxy acrylate, urethane acrylate, ester acrylate, and ether acrylate.

The photosensitive polymer gel material is cured by irradiating the same with UV light, far-infrared light, or electron rays from above. If the polymer material is a thermosetting resin, the polymer gel material is cured by hot air drying.

According to another aspect of the present invention, there is provided a flexible emitter manufactured according to the above method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
FIGS. 1A-1E illustrates a method for fabricating a flexible emitter according to an embodiment of the present invention.

FIGS. 1A-1F are cross-sectional views showing a method of fabricating a flexible emitter according to an embodiment of the present invention. Referring to FIG. 1A, a carbon material 12 having electro-luminescent (EL) characteristics is applied on a glass substrate 11. In this case, carbon nanotube (CNT), fullerene C60, diamond or diamond-like carbon (DLC), or graphite may be used as the carbon material 12. Although the CNT can be either single-walled or multi-walled, a single-walled CNT (SWNT) having a smaller diameter may be more suitable than multi-walled CNT (MWNT) since the former exhibits superior field emission characteristics to the latter. The carbon material 12 may be used in a paste or slurry form.

Figure 1B:

After applying the carbon material 12 on the glass substrate 11, the carbon material is patterned into a desired shape of an emitter pattern through ultraviolet (UV) exposure. FIG. 1B shows a state in which the carbon material 12 has been patterned on the glass substrate 11. During UV patterning, the carbon material 12 in a paste or slurry form is solidified.

As described above, an emitter pattern is formed by applying the carbon material to the glass substrate 11 and patterning the same. However, the emitter pattern may be formed in another way. For example, when the EL carbon material in a paste or slurry form is screen printed onto the glass substrate 11 through a mask having a desired emitter pattern, an emitter pattern 12 containing the carbon material may be formed on the glass substrate 11 as shown in FIG. 1B. For example the carbon material is spaced apart as seen in FIG. 1B. The emitter pattern 12 is then solidified by drying.

Figure 1C:

Referring to FIG. 1C, an electrode layer 13 is then formed on the emitter pattern 12 made of the carbon material. The electrode layer 13 may be formed by applying a paste containing silver (Ag) on the emitter pattern 12 and drying the same or by sputtering a metal material, such as Ag, onto the emitter pattern 12. If the emitter 12 and the electrode 13 formed as shown in FIG. 1C contain a high percentage of organic materials, the emitter 12 and the electrode 13 may be sintered to remove the organic materials.

Figure 1D:
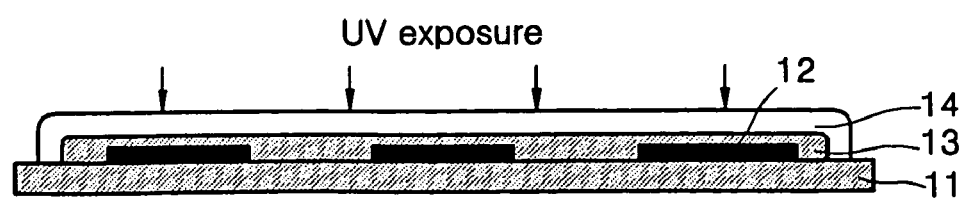

Subsequently, referring to FIG. 1D, the top surface and edges of the electrode layer 13 is completely coated with a polymer gel material 14 in order to form a polymer substrate of a flexible emitter. The polymer gel material 14 may be either photosensitive or thermosetting. UV curable polymer materials are mostly used as photosensitive polymer materials. A representative example of the UV curable polymer materials is an acrylate-based resin, such as epoxy acrylate, urethane acrylate, ester acrylate, or ether acrylate.

Then, the coated polymer gel material 14 is cured. When the polymer material is a thermosetting resin, hot air drying may be used for curing it. When the polymer material may be a UV (ultraviolet) curable polymer material such as acrylate-based resin, as shown in FIG. 1D, the polymer gel material 14 is irradiated with UV light from above the polymer gel material 14. Infrared or electron radiation may be used depending on the type of polymer material chosen. The cured polymer material serves as a polymer substrate of the flexible emitter according to an embodiment of the present invention. Therefore, the cured polymer material will be referred as to the polymer substrate.

Figure 1E:
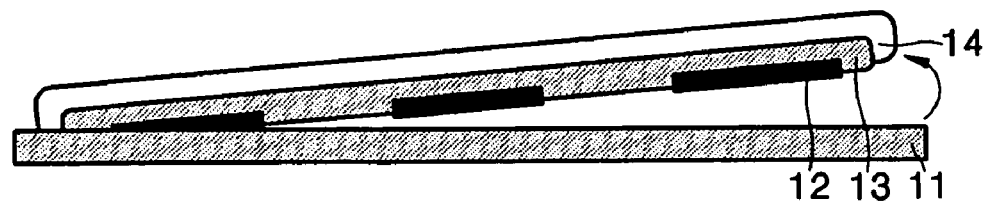

Once the polymer gel material 14 has been cured, the flexible emitter according to an embodiment of the present invention including the polymer substrate 14, the electrode 13, and the field emission emitter 12 is completely formed. As shown in FIG. 1E, the completed flexible emitter is separated from the glass substrate 11. Since an adhesive force between a carbon material such as a CNT (carbon nanotube) and a glass substrate is generally weak, it may be simple to separate the completed flexible emitter from the glass substrate 11.

When the completed flexible emitter is separated from the glass substrate 1, a very small portion of the CNT may remain on the glass substrate 11, thus allowing an upper tip of the CNT of the flexible emitter to be uniformly and clearly cut. Furthermore, as shown in FIG. 1E, portions of the emitter pattern 12 and the electrode 13 project out from the surface of the polymer substrate 14 due to adhesion to the glass substrate 11. Thus, the flexible emitter according to the present invention can achieve excellent field emission characteristics without a separate surface treatment (i.e., activation).

Figure 2A:
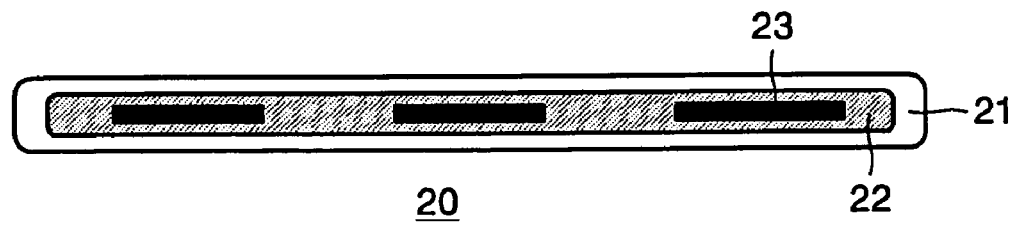
FIGS. 2A and 2B are plan view and cross-sectional view of a flexible emitter manufactured according to an embodiment of the present invention, respectively.
Figure 2B:
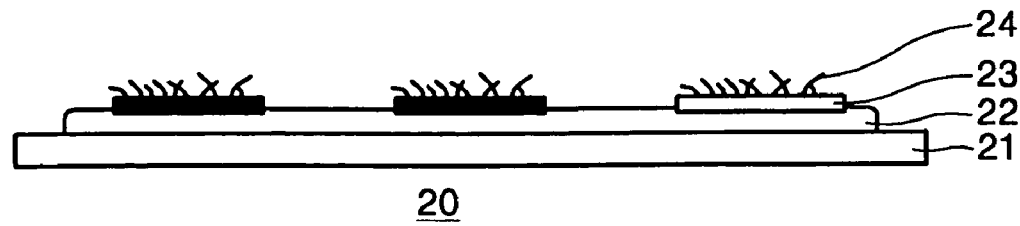

FIGS. 2A and 2B are a plan view and cross-sectional view, respectively, of a flexible emitter 20 manufactured by forming a CNT emitter on a polymer material. Referring to FIGS. 2A and 2B, a flexible emitter 20 includes an emitter pattern 23 made of CNTs, an electrode 22 underlying the emitter pattern 23, and a polymer substrate 21 underlying and surrounding the electrode 22. As shown in FIG. 2B, portions of tips 24 of the CNTs project outward.

Figure 3A:
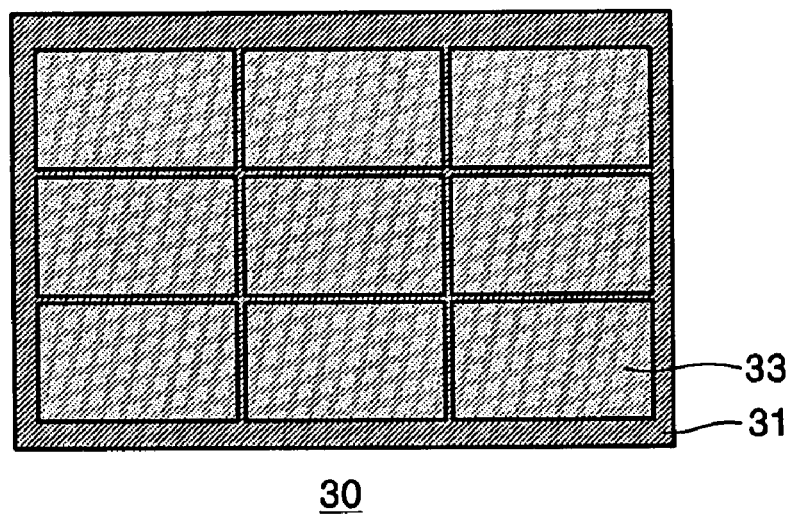
FIGS. 3A and 3B are a plan view of a flexible emitter manufactured according to another embodiment of the present invention and a perspective view of the flexible emitter of FIG. 3A bent, respectively.
Figure 3B:
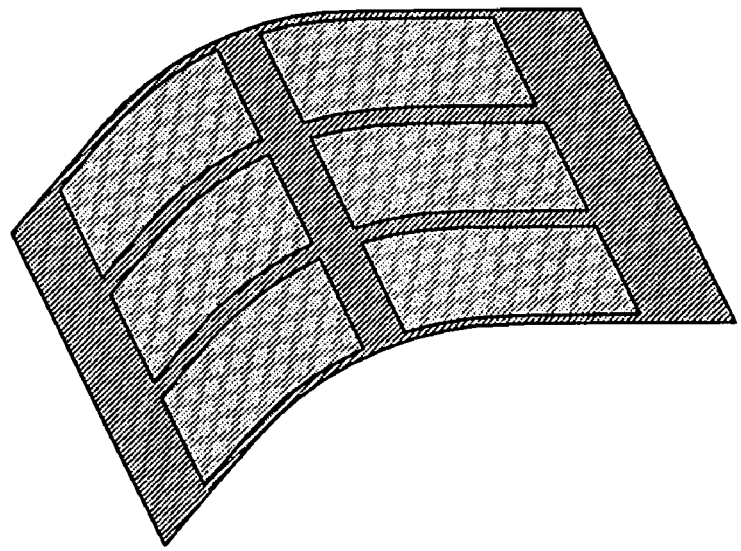
Figure 4A:
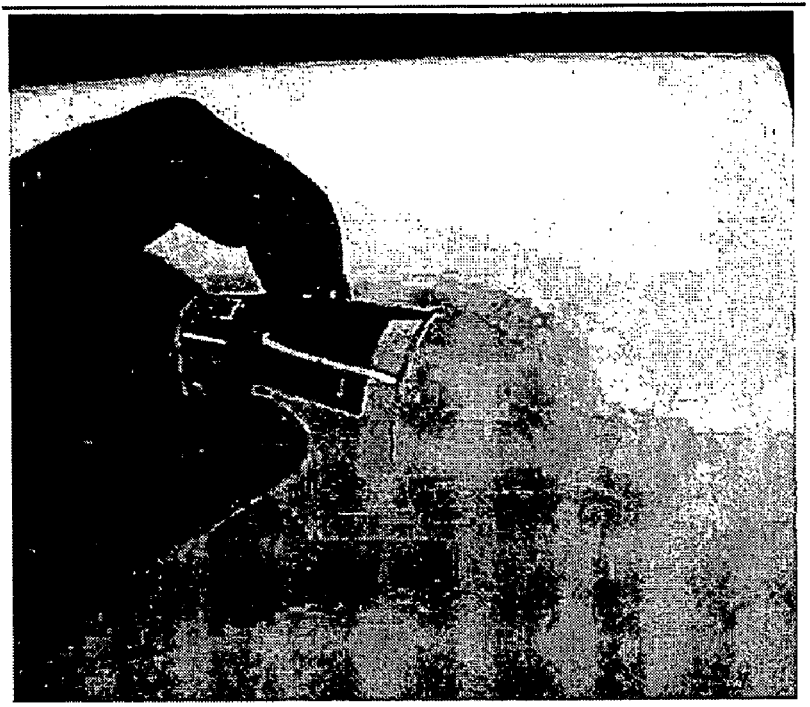
FIGS. 4A and 4B are photographs showing a completed flexible emitter bent and the flexible emitter emitting light, respectively.
Figure 4B:
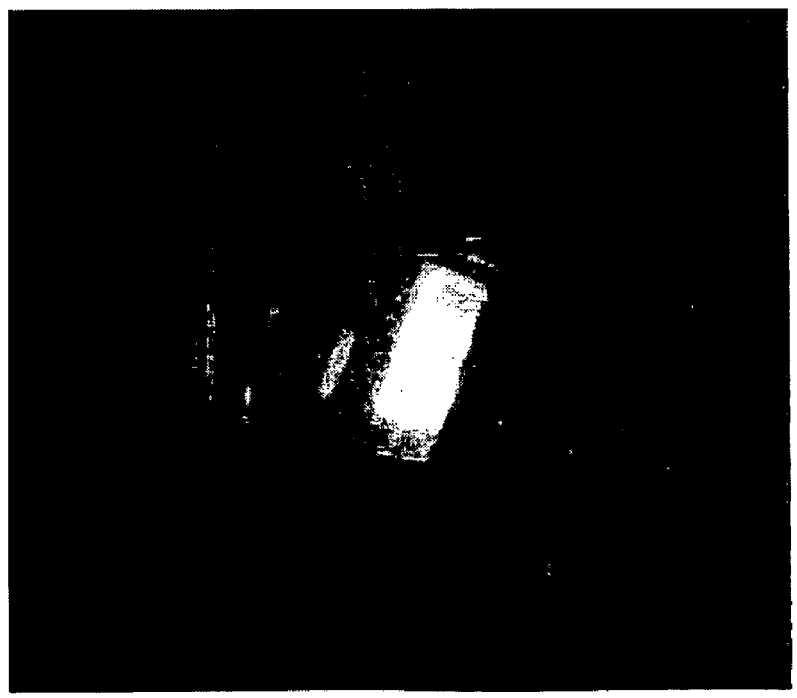

FIGS. 3A and 3B are a plan view of a flexible emitter manufactured according to another embodiment of the present invention. The present invention allows for the fabrication of a flexible emitter 30 with a large area as shown in FIG. 3A and with an emitter pattern 33 of varying shapes depending on the intended use. Since the flexible emitter can be fabricated with a thickness of about 100 μm (microns), it can easily be bent as shown in FIG. 3B. FIGS. 4A and 4B are photographs of a completed flexible emitter being bent and the flexible emitter emitting light, respectively.

Figure 5A:
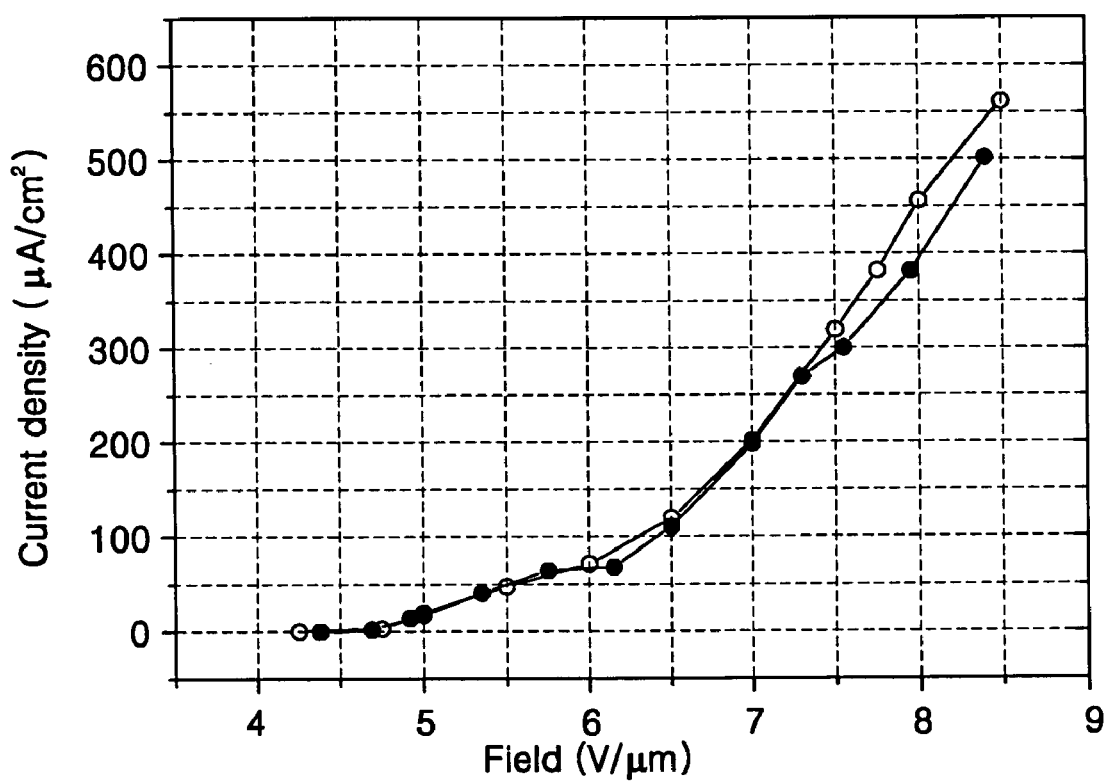
FIG. 5A is a graph of current-voltage (I-V) characteristics of a flexible emitter manufactured according to the present invention.
Figure 5B:
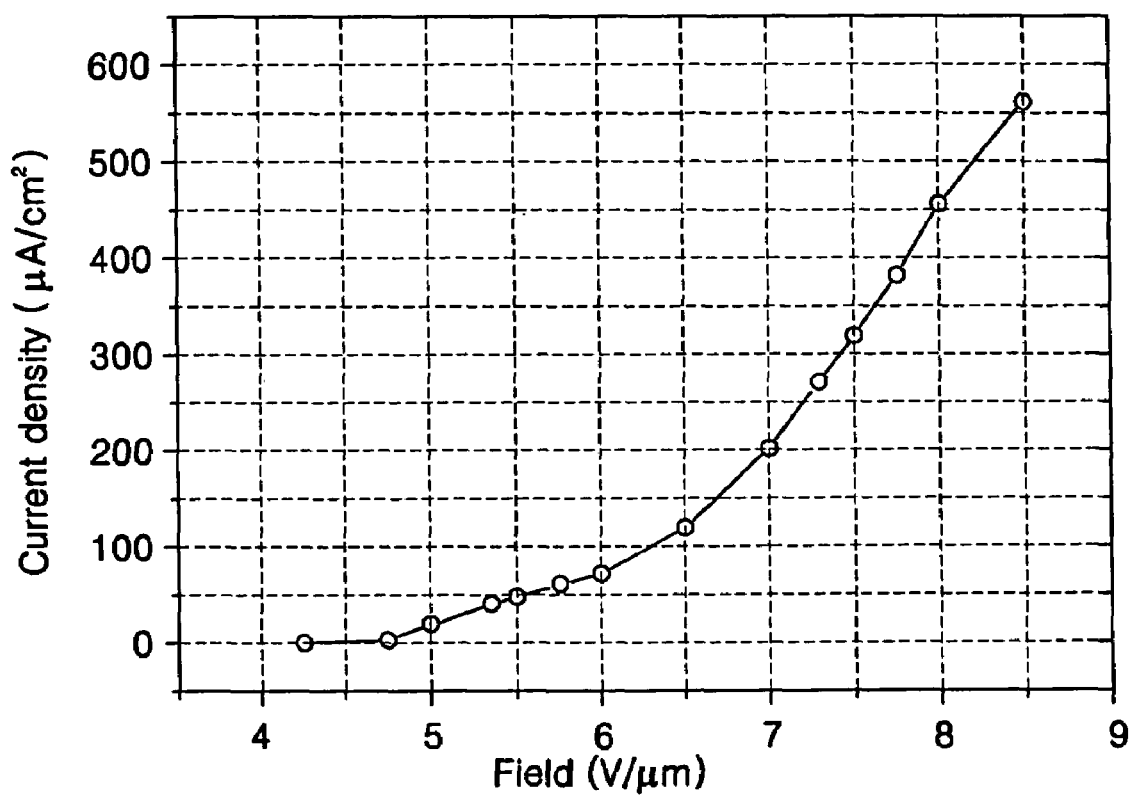
FIG. 5B is a graph of I-V characteristics of a typical rigid emitter.

FIG. 5A is a graph of current-voltage (I-V) characteristics of a flexible emitter manufactured according to the present invention in which white and black spots represent data measured on the same sample for the first time and for the second time, respectively. FIG. 5B is a graph of I-V characteristics of a typical rigid emitter manufactured by forming a CNT emitter on a rigid transparent substrate, such as glass. It is known that the conventional flexible emitter has inferior field emission characteristics when compared to a typical rigid emitter due to the reasons described above. However, upon comparison between data obtained from the experiments shown in FIGS. 5A and 5B, the flexible emitter according to the present invention indicates a current density of about 500~550 μA/cm$^2$ at electric field of 8.5V/μm while the typical rigid emitter indicates current density slightly higher than 550 μA/cm$^2$ in the same electric field. That is, the flexible emitter of the present invention has similar field emission characteristics to those of the rigid emitter.

Figure 6:
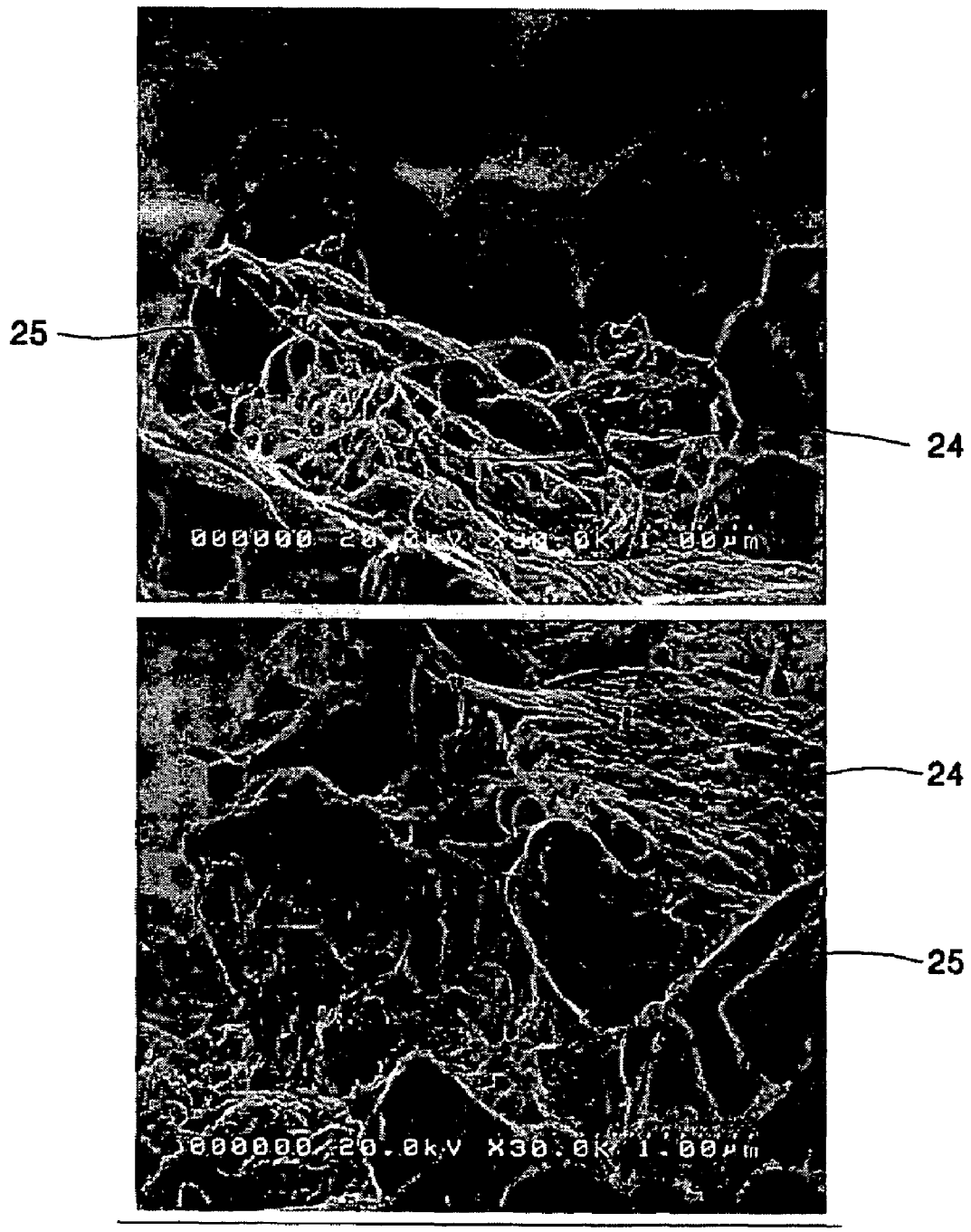
FIG. 6 is a scanning electron microscope (SEM) micrograph of a surface of a flexible emitter manufactured according to an embodiment of the present invention.

FIG. 6 is a scanning electron microscope (SEM) micrograph of a surface of a flexible emitter fabricated according to an embodiment of the present invention. Referring to FIG. 6, a CNT 24 appears to be a thin thread, and a filler used to reduce resistance along electron transfer pathways looks like a large lump 25 projecting from the emitter surface. In the illustrative embodiment, a paste in which a metal and a CNT are dispersed is applied to form an emitter. Since a large number of CNTs 24 project out from the surface of the flexible emitter, the flexible emitter can achieve excellent field emission characteristics.

A method of fabricating a flexible emitter according to the present invention has several advantages over a conventional method. The manufacturing method according to the present invention includes screen-printing a material containing the EL carbon material through a mask or patterning the same through UV exposure and printing/curing UV curable or thermosetting polymer on the emitter pattern for separation. Thus, the present invention allows for simple fabrication of a flexible emitter compared to a conventional method. It is also easy to fabricate a flexible emitter of varying shapes and sizes depending upon the type of application (display, sensor, FET, etc.).

Another advantage of the present invention is to allow the use of a carbon material in a paste or slurry form that has never been used since it tends to be easily removed during activation due to poor adhesion to indium tin oxide (ITO) or a metal substrate in spite of its excellent field emission characteristics. That is, since this material can be formed on the polymer substrate as an emitter in order to provide excellent emission characteristics, it is possible to widen the range of materials to be used for forming the emitter. Therefore, various emitter materials with excellent emission characteristics can be used to obtain a high quality flexible emitter.

Yet another advantage is to eliminate the need for activation since surface treatment is made automatically when the flexible emitter is separated from a glass substrate, thereby reducing the manufacturing costs and time. Therefore, the present invention provides a flexible emitter having superior characteristics with lower manufacturing costs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of fabricating a flexible emitter using a high molecular compound, comprising:
    forming an electro-luminescent carbon material on a glass substrate in a predetermined pattern in order to form an emitter pattern thereon;
    forming an electrode layer of a predetermined height on said emitter pattern and said glass substrate;
    applying a polymer gel material on said electrode layer;
    curing said polymer gel material; and
    separating said flexible emitter from said glass substrate.

2. The method of claim 1, wherein said emitter pattern is formed on said glass substrate by screen printing a carbon material in a paste form onto the glass substrate through a mask or by applying the carbon material in a paste form on said glass substrate and patterning the same through ultraviolet exposure.

3. The method of claim 2, wherein said carbon material includes at least one of a carbon nanotube, fullerene C60, diamond, diamond-like carbon, and graphite.

4. The method of claim 3, wherein the carbon nanotube includes at least one of single-walled and multi-walled carbon nanotube.

5. The method of claim 1, wherein said electrode layer is formed by applying a metal paste on said emitter pattern and said glass substrate and drying the same or by sputtering a metal material onto said emitter pattern.

6. The method of claim 5, wherein said metal is silver (Ag).

7. The method of claim 1, wherein said polymer material is a photosensitive polymer material.

8. The method of claim 7, wherein said photosensitive polymer material is an acrylate-based resin.

9. The method of claim 7, wherein said photosensitive polymer material includes at least one of epoxy acrylate, urethane acrylate, ester acrylate, and ether acrylate.

10. The method of claim 7, wherein said photosensitive polymer gel material is cured by irradiating said photosensitive polymer gel material with one of ultraviolet light, far-infrared light, and electron rays from above said photosensitive polymer gel material.

11. The method of claim 1, wherein said polymer material is a thermosetting polymer material.

12. The method of claim 11, wherein said thermosetting polymer gel material is cured by hot air drying.

13. A method of fabricating a flexible emitter, comprising:
    applying a carbon material to a glass substrate by applying a layer or pattern of carbon material to form an emitter layer or pattern;
forming an electrode layer on said emitter layer or pattern made of said carbon material;
coating a top surface and edges of the electrode layer completely with a polymer gel material to form a polymer substrate of a flexible emitter;
curing said polymer gel material by irradiated with ultraviolet light from above said polymer gel material; and
separating a completed flexible emitter from said glass substrate.

14. The method of claim 13, wherein forming said electrode layer being formed by applying a paste containing a first metal material on said emitter layer or pattern, and drying or by sputtering a second metal material onto said emitter pattern.

15. The method of claim 13, with said first and second metal material being Ag.

16. The method of claim 13, with when said emitter and said electrode layer formed as to include a high percentage of organic materials, said emitter and said electrode layer being sintered to remove said organic materials.

17. The method of claim 13, with said polymer gel material being cured by hot air drying.

18. A method of fabricating a flexible emitter, comprising:
   forming an electro-luminescent carbon material on a glass substrate in a predetermined pattern to form an emitter pattern thereon;
   forming an electrode layer of a certain height on said emitter pattern and said glass substrate;
   applying a polymer gel material on said electrode layer; and
   separating said flexible emitter from said glass substrate.

19. The method of claim 18, wherein said emitter pattern is formed on said glass substrate by screen printing a carbon material in a paste form onto the glass substrate through a mask or by applying the carbon material in a paste form on said glass substrate and patterning the same through ultraviolet exposure, said carbon nanotube is single-walled, and said electrode layer is formed by applying a metal paste on said emitter pattern and said glass substrate and drying the same or by sputtering a metal material onto said emitter pattern.

* * * * *